(No Model.)
G. VÖLLNER.
APPARATUS FOR ASCERTAINING THE CAPACITY OF HOLLOW VESSELS.
No. 516,248.    Patented Mar. 13, 1894.
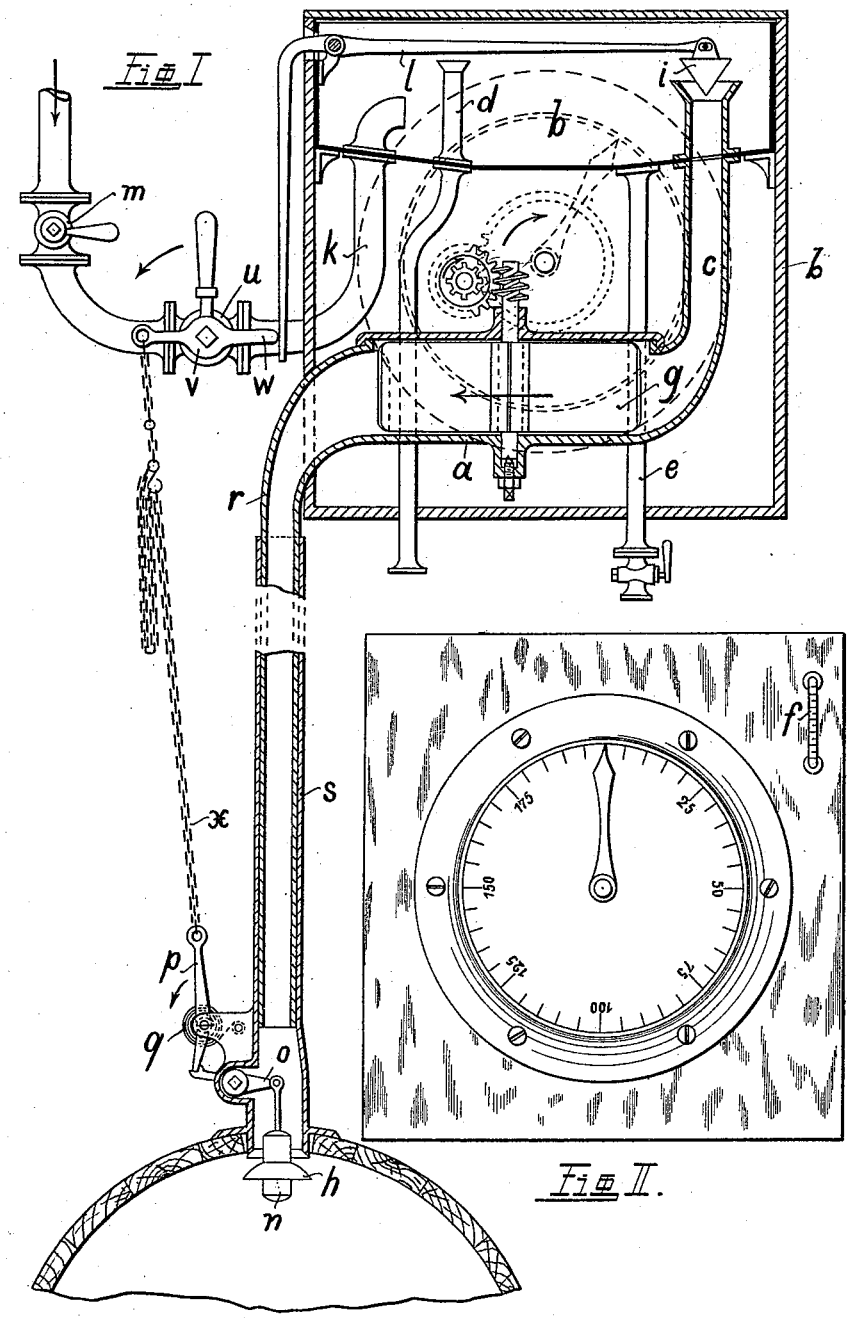
Witnesses
C. B. Bolton
E. K. Sturtevant
Inventor
Georg Völlner
By Attorneys
Richards & Co

UNITED STATES PATENT OFFICE.

GEORG VÖLLNER, OF BERLIN, GERMANY.

APPARATUS FOR ASCERTAINING THE CAPACITY OF HOLLOW VESSELS.

SPECIFICATION forming part of Letters Patent No. 516,248, dated March 13, 1894.

Application filed June 9, 1893. Serial No. 477,062. (No model.) Patented in Germany November 24, 1892, No. 69,258; in France January 9, 1893, No. 227,000; in Austria-Hungary March 25, 1893, No. 61,852 and No. 90,652; in England May 2, 1893, No. 8,790, and in Switzerland May 3, 1893, No. 6,710.

*To all whom it may concern:*

Be it known that I, GEORG VÖLLNER, mechanical engineer, a subject of the German Emperor, and a resident of Berlin, in the Kingdom of Prussia, German Empire, have invented certain new and useful Improvements in Devices or Apparatus for Ascertaining the Capacity of Hollow Vessels, of which the following is a full, clear, and exact specification.

This invention has been patented in Germany November 24, 1892, No. 69,258; in Austria-Hungary March 25, 1893, No. 61,852 and No. 90,652; in France January 9, 1893, No. 227,000; in Switzerland May 3, 1893, No. 6,710, and in Great Britain May 2, 1893, No. 8,790.

In order to accurately ascertain the capacity of vessels, especially barrels for holding spirits, petroleum, &c., it has hitherto been the custom to either take the weight of the barrels in question before and after being filled with a liquid of known specific weight, or, where such was not convenient, the barrels were filled full and then again emptied, the liquid being discharged and collected in vessels of known capacity.

This invention relates to a device which renders it possible to utilize rotary water meters of the usual form of construction for the purpose of ascertaining the capacity of vessels by causing water or other suitable liquid to flow from a water pipe, or other suitable receptacle, into another receptacle by automatically shutting off the inflow when the operation of filling has been completely finished so that any overflow is avoided, the capacity of the vessel in question being then taken by a reading of the index of the water meter which is placed before each measurement at zero.

Water meters, of the usual form of construction, are not suitable for exact determinations of capacity, the alterations in the pressure of the inflowing liquid causing considerable errors in the measurement; to remove this source of error is the object of this invention. This is attained by inserting, between the water meter and those vessels from which the liquid is to be drawn and measured, a regulating vessel in which the liquid is maintained at a constant level so that it flows through the water meter at an always steady rate of speed, and objectionable alterations in the revolution of the water wheel cannot take place.

It is preferable in order to complete the apparatus, to arrange a device which, as soon as the filling of the barrel, the capacity of which is to be taken, is completed, automatically closes the water meter, as well as the regulating vessel, so that the liquid still flowing from the supply reservoir cannot effect the result of the measurement. In the annexed drawings an apparatus of this kind is shown in Figures I and II Fig. I showing a partial section and Fig. II a front elevation.

The apparatus serving for ascertaining the capacity of barrels has a case *b* inclosing the measuring apparatus on which the water gage glass *f* and the dial for reading off the quantity of water flowing through the apparatus are arranged. There is also a water meter *a* of any suitable pattern, the float wheels *g* of which, when revolving, set in operation an indicating device. This water meter is connected at the top by means of a pipe *c* with the regulating vessel into which the liquid which is to be measured is conveyed through a pipe *k*. The water meter is extended underneath to form a pipe *r* above which a second pipe 5, the covering pipe, is adjustably arranged, this latter being inserted (as far as a flange on its lower end) in the bung hole of the cask or vessel, the capacity of which is to be taken. By thus having two pipes, adjustably arranged, they can be pushed together or drawn apart according to whether the apparatus or the vessel which is to be measured, stands higher or lower.

In order, when the filling of the barrel is completed, to obtain an automatic shutting off of the water meter, a float *n* is inserted in the under part of the covering pipe which floats, in its highest position, that is to say, when the same is raised by the liquid, closes the lower opening of the covering pipe by means of a ring *h* and thus shuts off the supply. The float is arranged on a lever *o*, the outwardly projecting arm of which when the float assumes its lowest position, presses against one arm of a second two armed lever $p$ and retains the same in its position acting against the pressure of a spring $q$ connected therewith. The other arm of this second lever, which is provided with an eyelet, is connected by means of a chain $x$, or the like, with a lever attached to the top of a cock $u$ inserted in the supply pipe of the apparatus. The arm $w$ of this latter lever bears, when the the cock is opened, that is to say when in a horizontal position, against one arm of a lever $b'$ arranged on the regulating vessel and maintains the same in such a position that the valve $i$ which is arranged at the end of the arm and which projects into the regulating vessel, does not close the supply pipe to the water meter. An overflow pipe $d$ is also provided which has for its object to always maintain the liquid in the regulating vessel at an equal height.

In order, when the apparatus is not at work to allow of all the water being removed from the regulating vessel of the apparatus, a discharge pipe $e$ is also provided. Further, a water gage glass $f$ is arranged on the regulating vessel so that it may easily be seen from the outside whether the inflow of water is too great or too little, the inflow may then be regulated by means of a second cock arranged in the inflow pipe.

The mode of working and handling of the apparatus hereinbefore described is as follows:—After the lower end of the covering pipe has been inserted in the vessel, the capacity of which is to be taken, the float with its allied levers, as well as the lever of the tap and therewith the lever with the closing plug are arranged in position. The levers of the float and tap are then connected with one another by means of the chain, but not too tightly. The cock is then opened so that the water can run in: the water flows then into the regulating vessel and passes from there through the pipe into the water meter, setting the float wheel and thereby the indicating device in motion, and it reaches the vessel through the exit pipe and its covering pipe. When the latter is filled to within a short distance of the bung hole the float rises and thus brings its two allied levers out of connection. The spring then comes into action and turns the two levers, connected by means of the chain in a direction whereby the inflow of water to the regulating vessel is shut off as well as the inflow to the water meter through the downward movevent of the lever which has a closing plug at its end. The water still contained in the water meter after the shutting off of the tap can flow into the barrel until the latter is completely filled, whereupon the outflow opening and the covering pipe are also closed by means of the float. The amount of liquid indicated by the index which has passed through the water meter is then read off fron the dial, and thus an exact estimate of the contents of the vessel or barrel is obtained.

Having now particularly described and ascertained the nature of my said invention and in what manner the same is to be performed, I declare that what I claim, and desire to secure by Letters Patent of the United States, is—

1. In combination in a device for measuring the contents of vessels or barrels, a rotary meter $a$, a regulating vessel $b$ inserted between this meter and the source of supply, the inlet pipe leading into the vessel, the discharge pipe therefrom to the meter, the conduit from the meter to the vessel to be measured, and the overflow pipe leading from the intermediate vessel, substantially as described.

2. A device for measuring the contents of vessels consisting of a rotary water meter, a regulating vessel $b$ connected therewith and with the source of supply, a tube $(r)$ arranged at the exit point of the water meter $(a)$, a covering tube $(s)$ adjustable on this tube $(r)$, a float $(n)$ arranged at the end of the tube $(s)$ and attached to a lever $(o)$, which float is connected with the lever $(p)$ provided with a tension spring $(q)$, and with a lever $(v)$ attached to the tap of a cock $(u)$ inserted in the supply pipe $(k)$, one arm of which lever is connected by means of a chain $(x)$ with the lever $(p)$, and its other arm $(w)$ with the lever $(l)$ carrying a valve $(i)$, for causing an automatic shutting off of the supply to the regulating vessel, to the water meter and to the vessel which is to be measured by means of the float $(n)$ at the moment when the vessel which is to be measured is filled, substantially as and for the purpose set forth.

3. In combination in a device for measuring the contents of vessels, the rotary meter, the conduit pipe leading therefrom to the vessel to be measured, the float in said vessel $b$ for regulating the pressure of liquid to the rotary meter, the supply pipe connected thereto having a stop cock, the pipe leading from the said regulating vessel to the meter having a cut off valve and the connections from the float in the vessel to be measured to the stop cock in the supply pipe and to the cut off valve between the regulating vessel and the meter, substantially as described.

In witness whereof I have hereunto set my hand in presence of two witnesses.

GEORG VÖLLNER.

Witnesses:
PAUL AULICH,
REINHOLD WEIDNER.